(12) United States Patent
Schoppmeier

(10) Patent No.: US 9,288,335 B2
(45) Date of Patent: Mar. 15, 2016

(54) METHOD AND SYSTEM FOR A FLEXIBLE LOW POWER MODE

(75) Inventor: Dietmar Schoppmeier, Unterhaching (DE)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 197 days.

(21) Appl. No.: 13/602,377

(22) Filed: Sep. 4, 2012

(65) Prior Publication Data

US 2013/0058237 A1 Mar. 7, 2013

Related U.S. Application Data

(60) Provisional application No. 61/531,063, filed on Sep. 5, 2011.

(51) Int. Cl.
*G06F 11/00* (2006.01)
*H04M 11/06* (2006.01)
*H04L 1/00* (2006.01)

(52) U.S. Cl.
CPC ............ *H04M 11/062* (2013.01); *H04L 1/0002* (2013.01); *Y02B 60/31* (2013.01); *Y02B 60/36* (2013.01)

(58) Field of Classification Search
None
See application file for complete search history.

(56) References Cited

U.S. PATENT DOCUMENTS

| 7,869,360 | B2 * | 1/2011 | Shi | 370/231 |
|---|---|---|---|---|
| 2003/0123486 | A1 * | 7/2003 | Lacey, III | 370/485 |
| 2005/0144330 | A1 * | 6/2005 | Richardson | 710/1 |
| 2007/0140691 | A1 * | 6/2007 | Gao et al. | 398/38 |
| 2009/0049347 | A1 * | 2/2009 | Shridhar | H04L 1/0003 714/704 |
| 2009/0086798 | A1 * | 4/2009 | Zukunft et al. | 375/222 |
| 2011/0126255 | A1 * | 5/2011 | Perlman | A63F 13/12 725/116 |
| 2011/0246798 | A1 * | 10/2011 | Bilgin et al. | 713/310 |
| 2011/0299579 | A1 * | 12/2011 | Cioffi et al. | 375/222 |
| 2012/0027411 | A1 * | 2/2012 | Gao et al. | 398/66 |
| 2012/0289161 | A1 * | 11/2012 | Caruana | 455/41.2 |
| 2013/0236179 | A1 * | 9/2013 | Gao et al. | 398/67 |
| 2013/0329816 | A1 * | 12/2013 | Zukunft et al. | 375/259 |

FOREIGN PATENT DOCUMENTS

| CA | 2308533 A1 | 5/2000 |
|---|---|---|
| EP | 1998524 A1 | 12/2008 |
| WO | 02058310 A2 | 7/2002 |

OTHER PUBLICATIONS

Arthur Redfern Texas Instruments USA et al: An Efficient L2 Mode for VDSL2; D1067, ITU-T Draft Study Period 2001-2004, International Telecommunication Union, Geneva; CH, vol. Study Group 15, Apr. 19, 2004, pp. 1-9, XP017417800.
European Search Report in connection with application No. 12182960.0-2414 dated Jan. 18, 2013.

* cited by examiner

*Primary Examiner* — Jay P Patel

(57) ABSTRACT

What is disclosed is a method for transmitting DSL data including establishing a communication link between a first unit and a second unit, the communication link selectively operable according to one of a plurality of management states, each of said management states defined by at least one fixed control parameters associated with a predetermined value. The method also includes initiating operation of the communication link according to a first management state; transmitting from the first unit a request to the second unit to modify said predetermined value; and implementing the request while said link is operating according to the first management state.

23 Claims, 15 Drawing Sheets

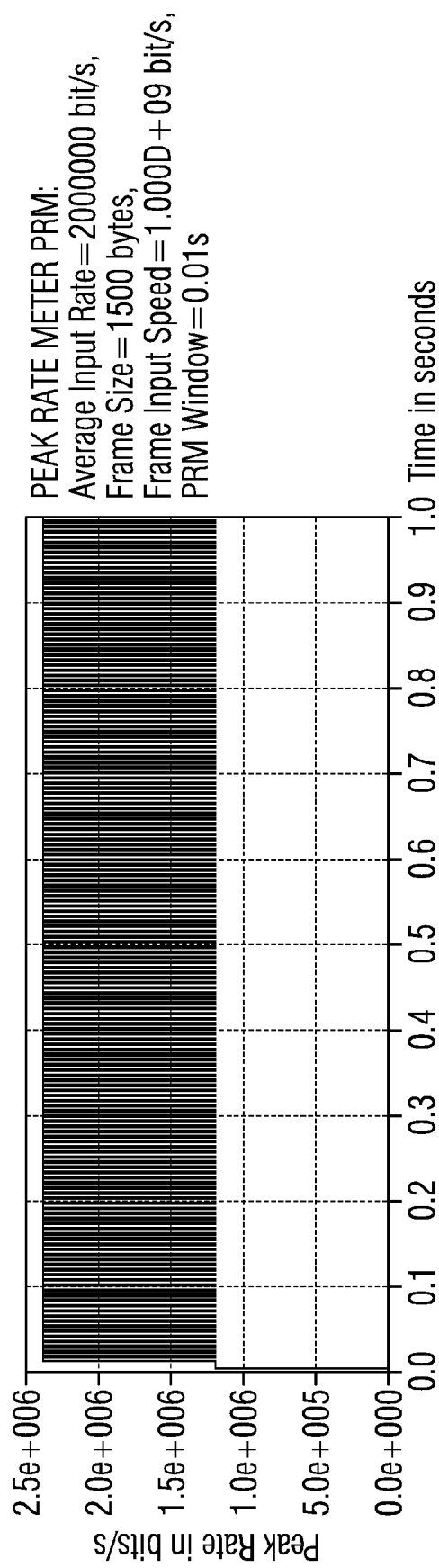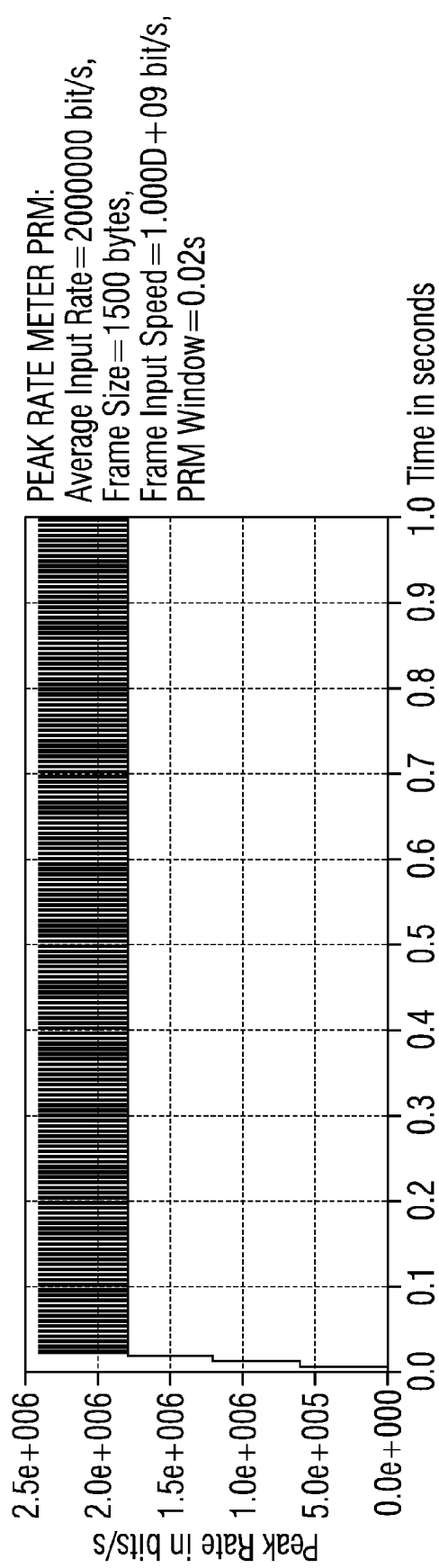

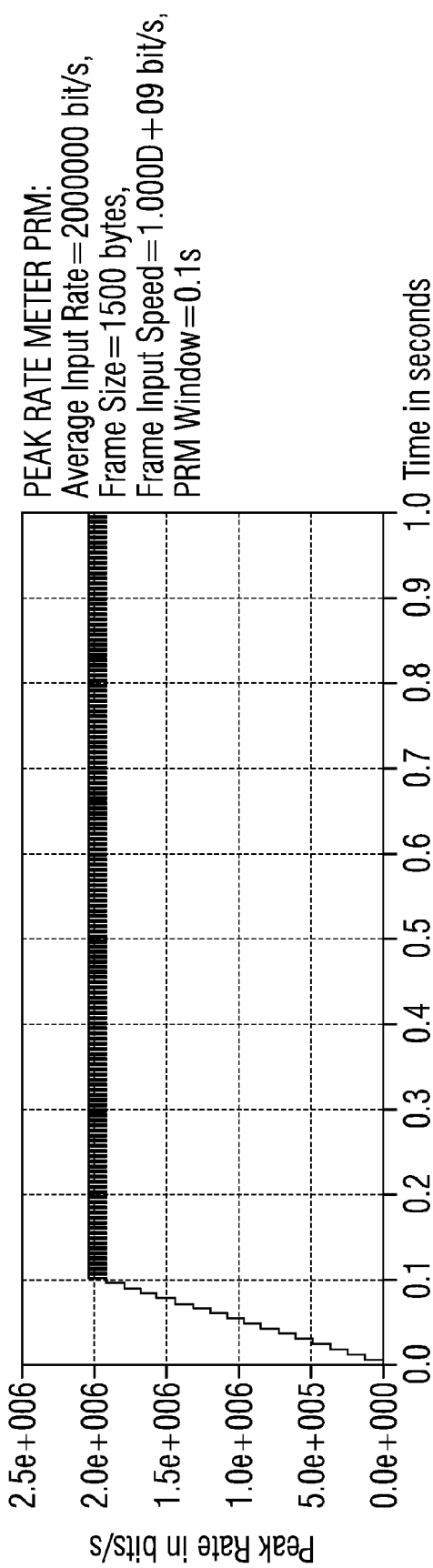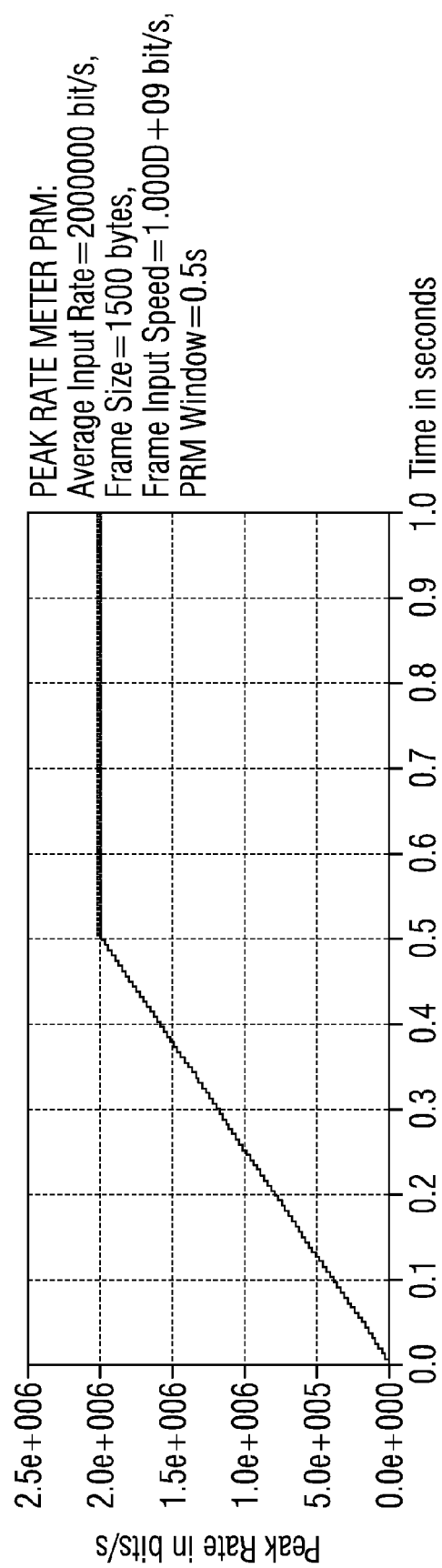

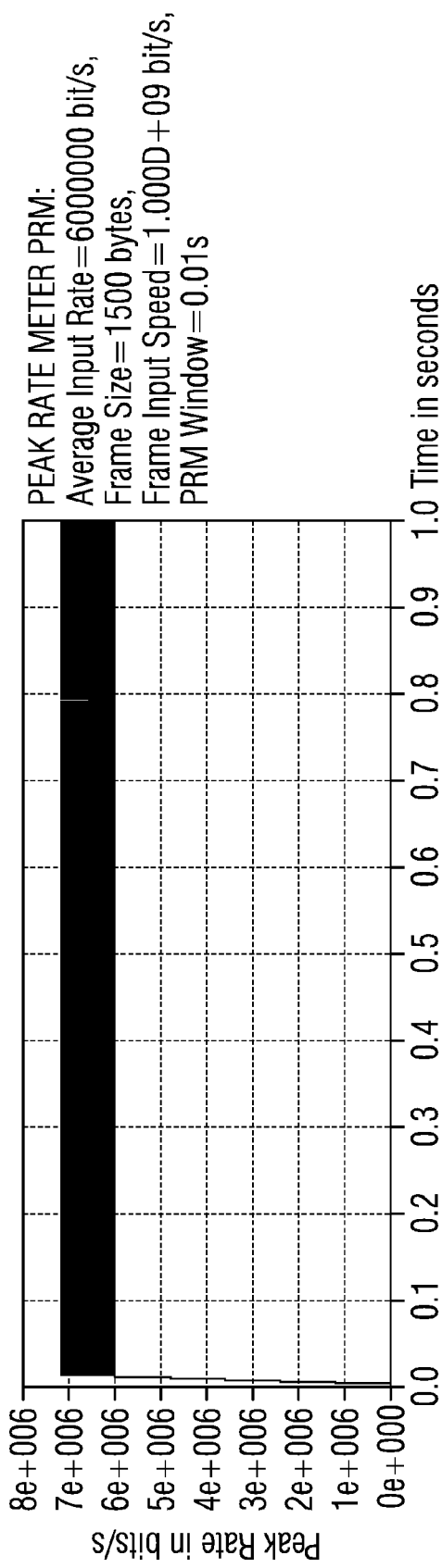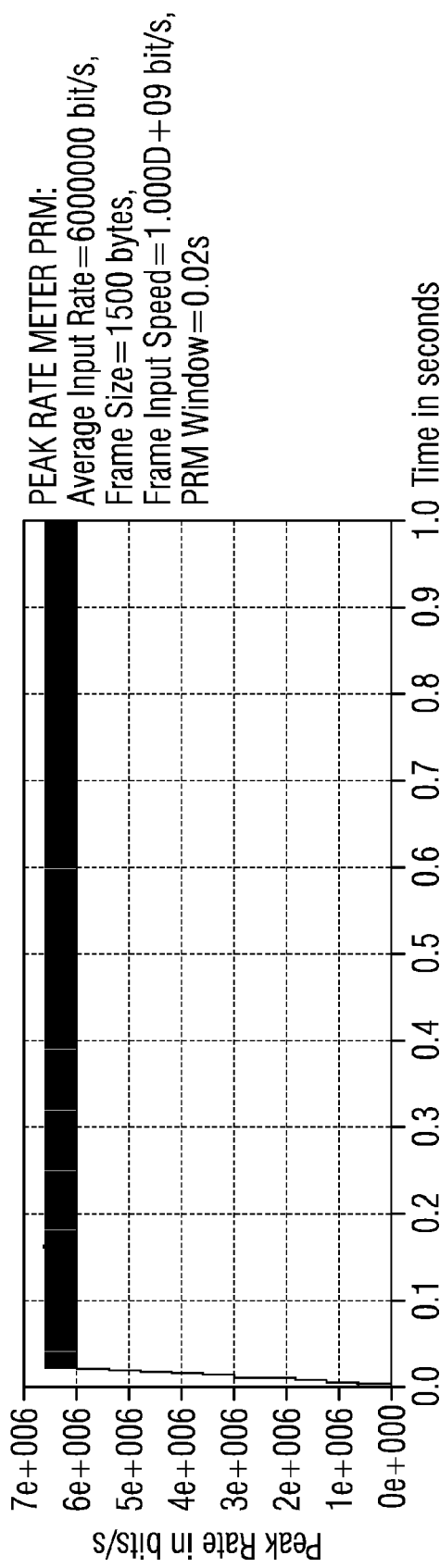

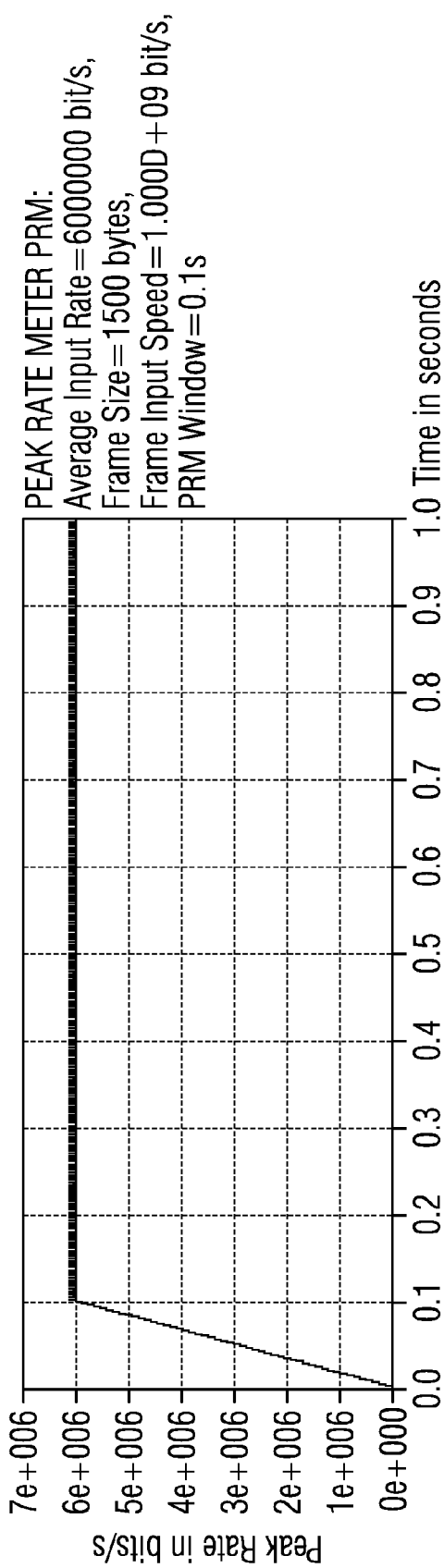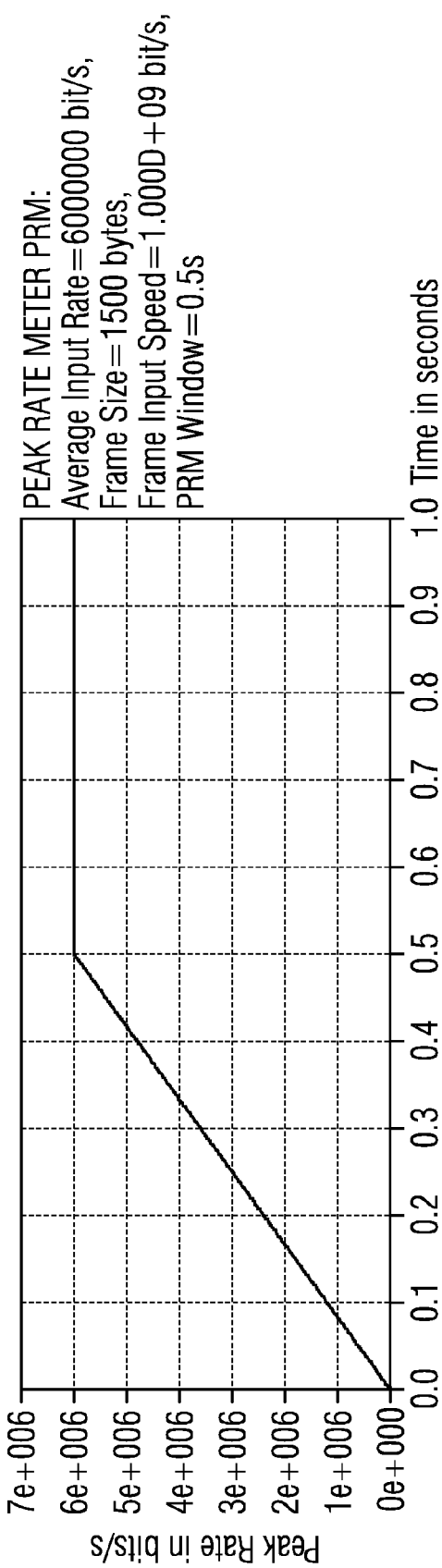

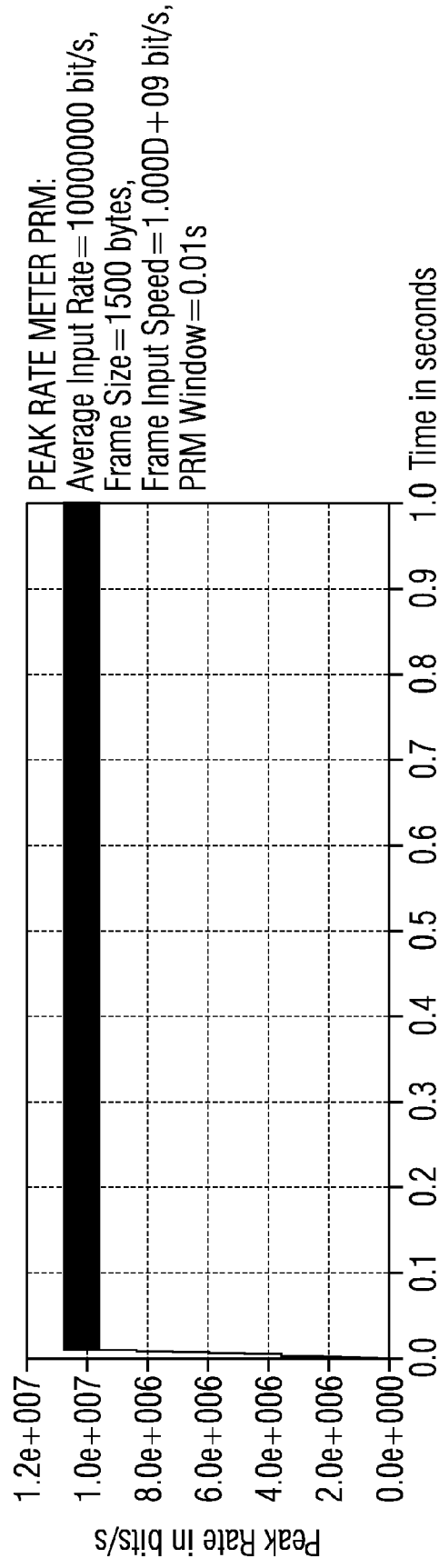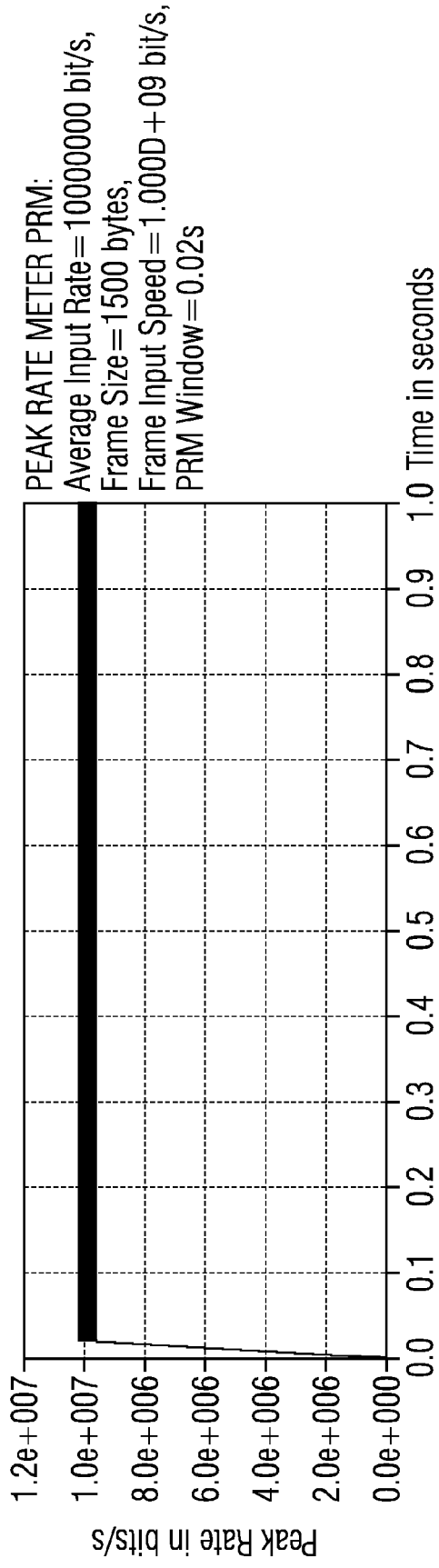

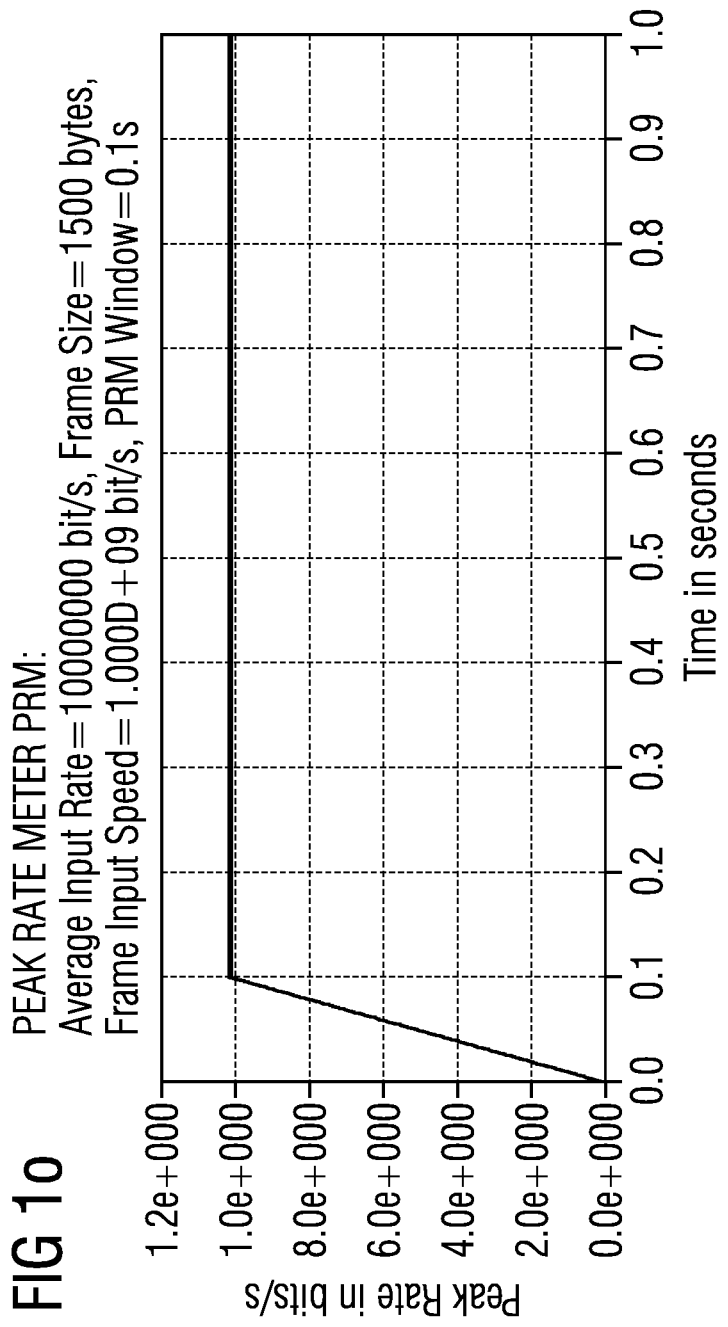

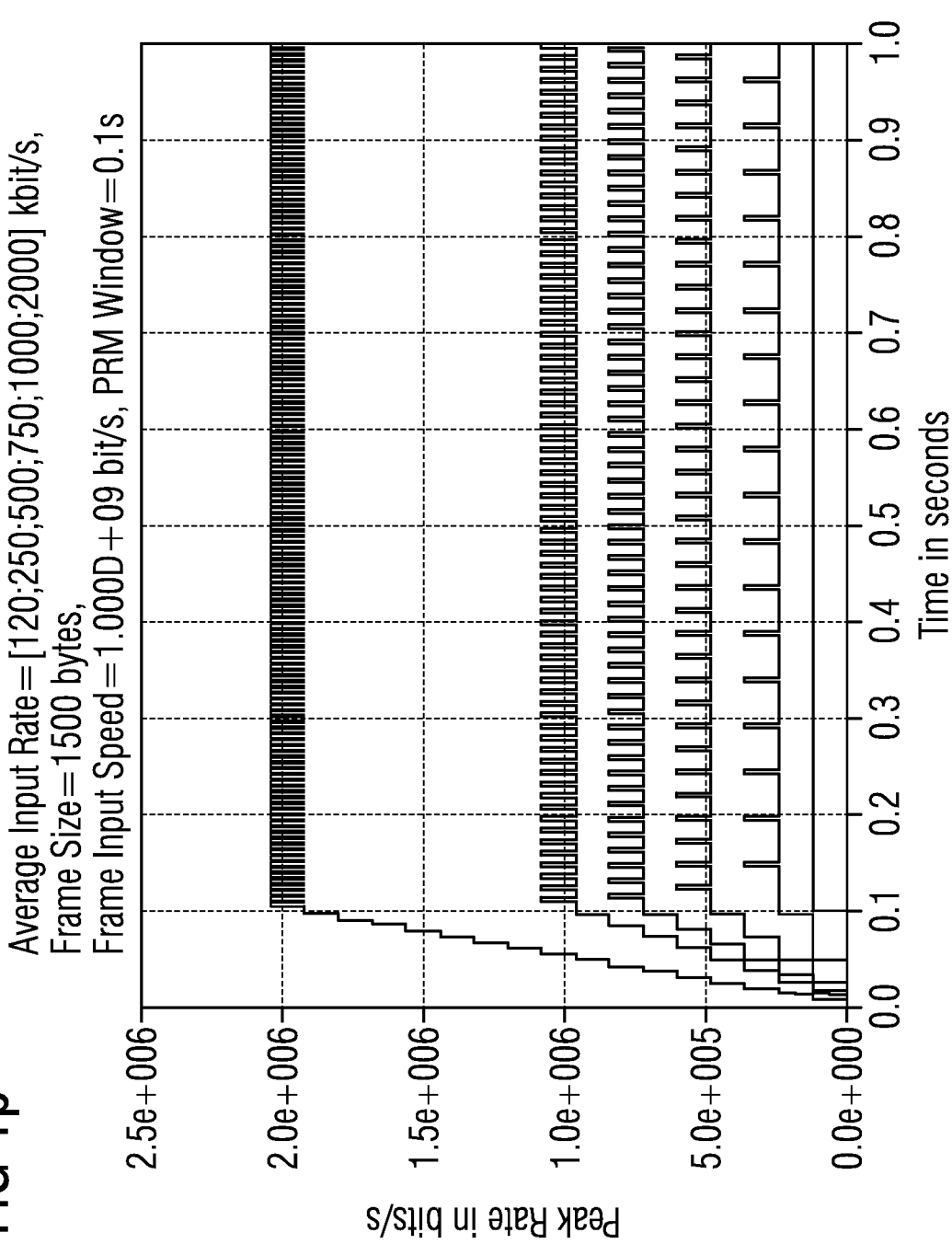

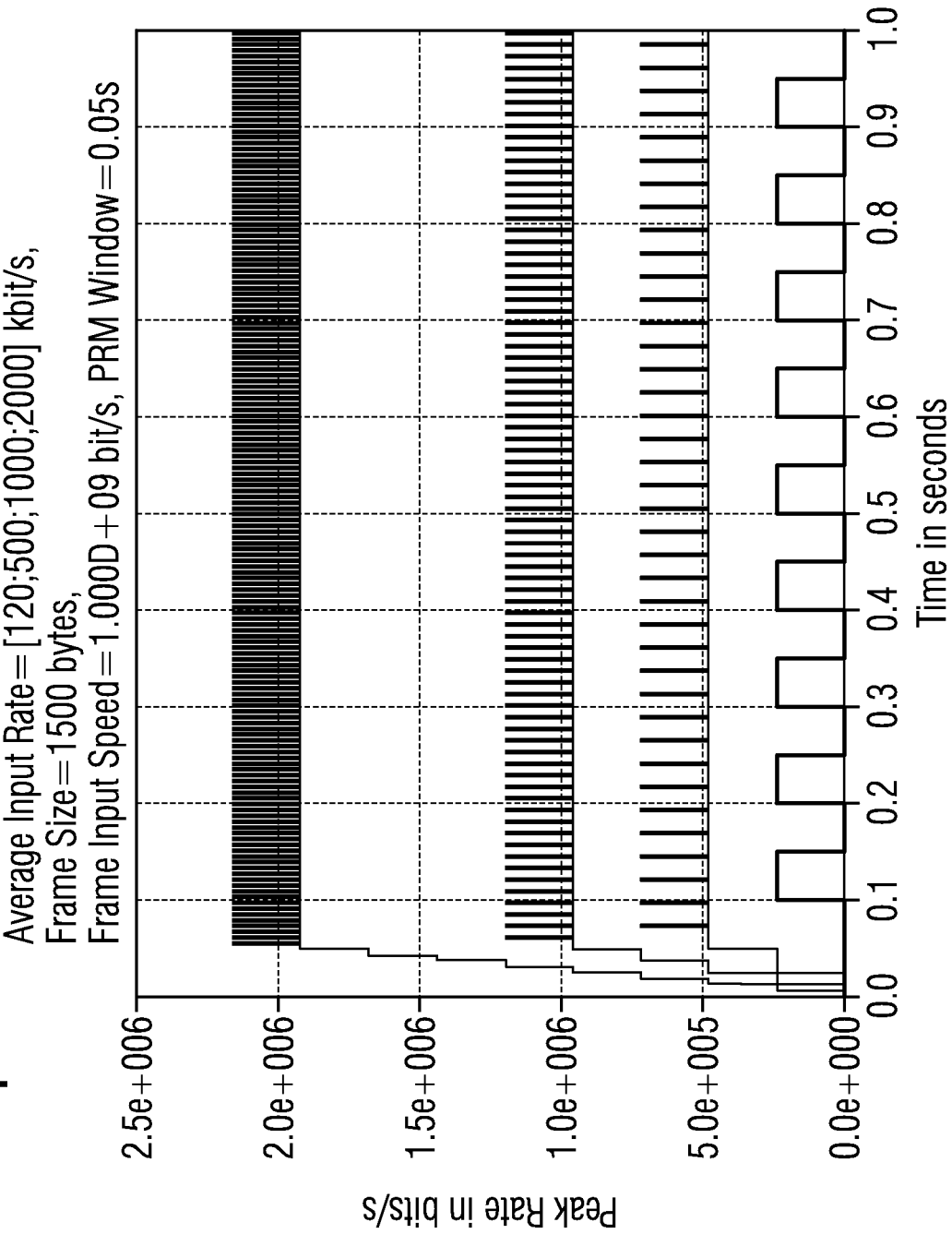

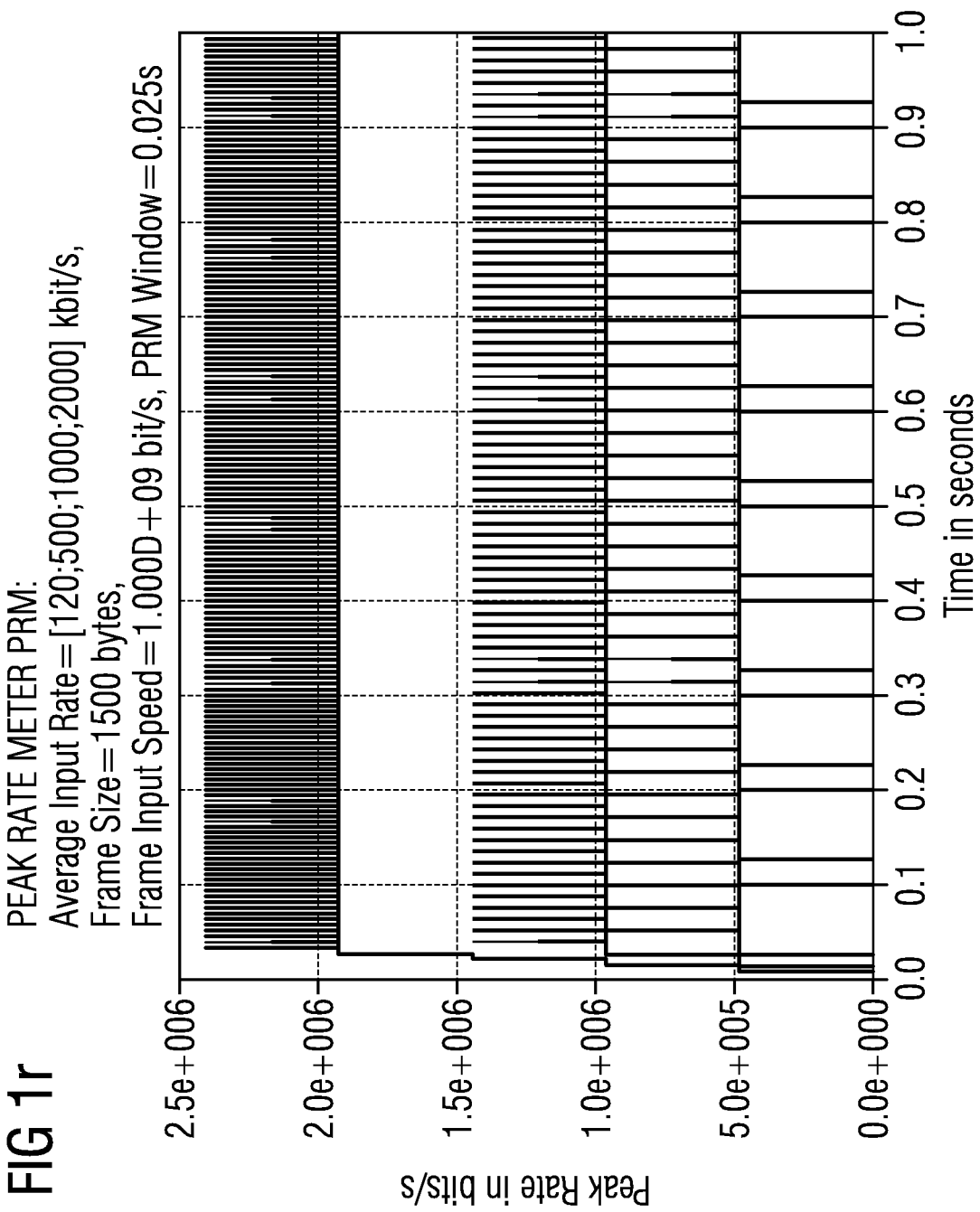

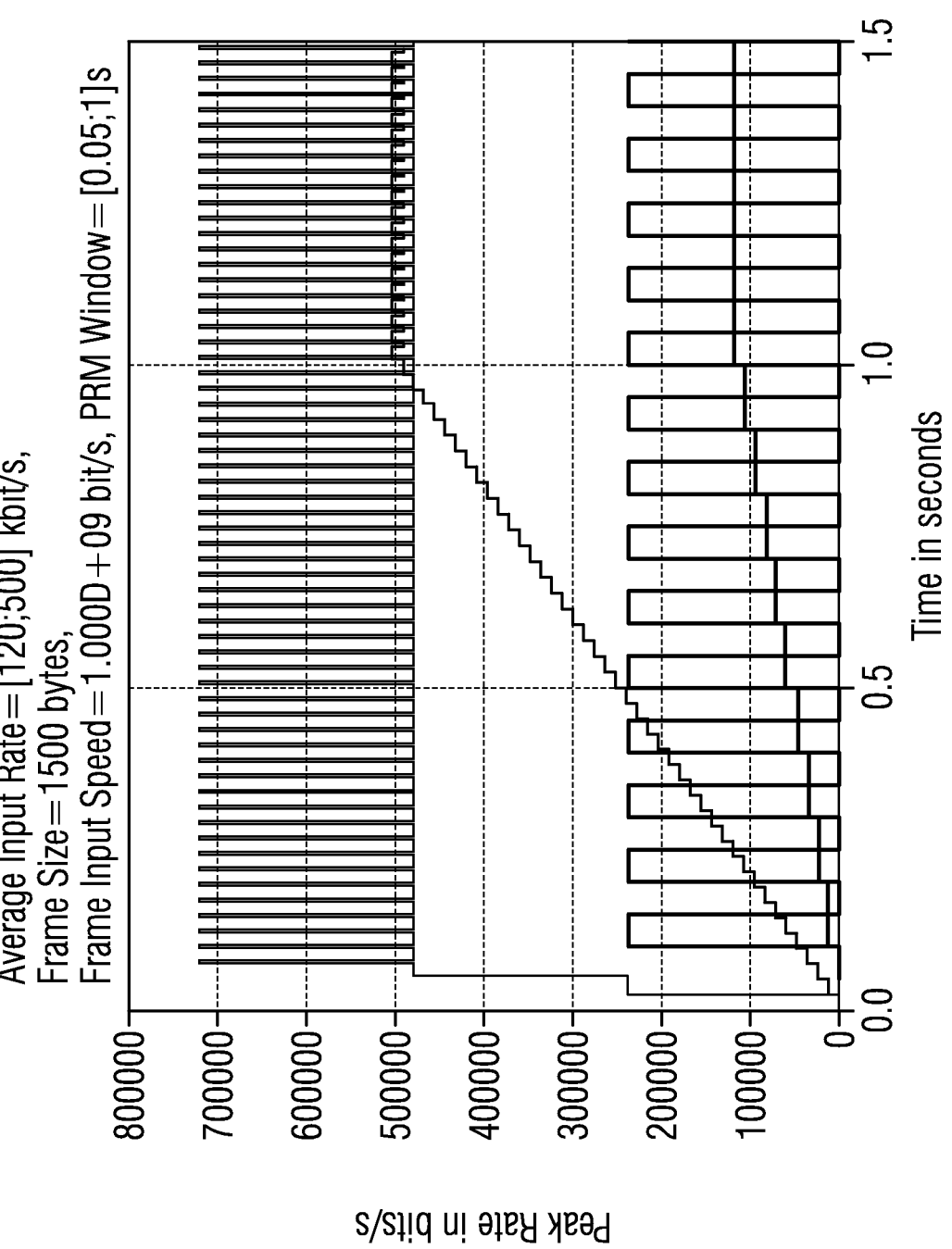

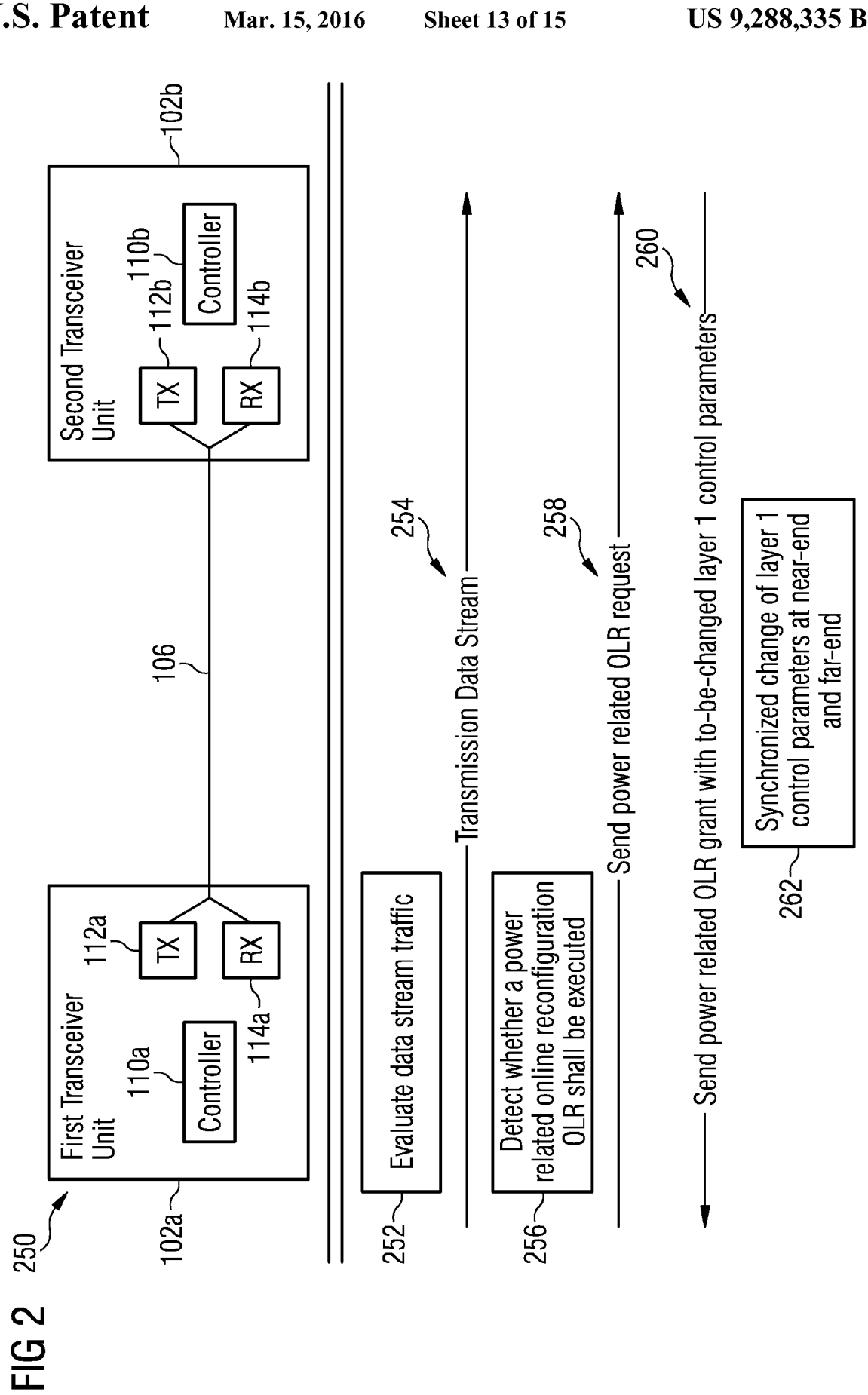

METHOD AND SYSTEM FOR A FLEXIBLE LOW POWER MODE

CROSS REFERENCE TO RELATED APPLICATION

This application claims the benefit of U.S. Provisional Application No. 61/531,063, filed Sep. 5, 2011.

SCOPE

The present disclosure relates to communication technology, and more particularly to digital subscriber line (DSL) communication.

BACKGROUND

DSL service may be provided according a set of published standards including ITU-T G.992.3, ITU-T G.998.1, ITU-T G.997.1, ITU-T I.361 and ATM Forum Technical Committee "Specification of the Device Control Protocol", Version 1.0 (af-phy-138.000) the entirety of which are expressly incorporated by reference herein.

In order to save power in DSL communication, it is desirable to switch from the normal power state L0 to the power state L2, as standardized, for example, in ITU-T 6.8/G.992.3, on the basis of bandwidth utilization.

For example, after running up in L0 mode, the DSL link may have a net data rate of NDR_L0=17 Mbit/s, which corresponds to approximately 10 asynchronous transfer mode (ATM) cells per symbol when the transmission convergence (TC) sublayer is ATM-based. In order to save as much power as possible, a low minimum L2 net data rate of 128 kbit/s may be configured.

In the L0 power state, an entity in the physical layer (PHY) or network controller (NC) measures the useful rate, and, if it is permanently below the configured 128 kbit/s, a transition to L2 is initiated. In the L2 power state, an entity in the PHY or network controller measures the bandwidth utilization, and, if this is permanently 100%, the system switches back to the L0 power state.

In practice, the output scheduler in the network controller needs to be set to the actual available net data rate, and this should be accomplished as quickly as possible. This is necessary for all online reconfigurations where the net data rate is altered, that is to say including in seamless rate adaptation (SRA). If the scheduler is not matched to a higher data rate quickly enough, a large amount of useful data becomes queued in the network controller until data may be rejected.

Further, if the useful rate is permanently below a value between NDR_L0 and NDR_L2, the L0 state is retained and no power is saved.

Still further, a useful rate in L2 permanently below NDR_L2, for example a constant bit rate (CBR) of 120 kbit/s, should not result in an L2→L0 transition.

Still further, when the useful rate in L2 rises abruptly, such as from 120 kbit/s CBR to 17 Mbit/s CBR, data need to be queued during the L2→L0 transition time (such as at 10 cells per symbol). This may result in a large number of cells no longer being able to be stored in the cell memory of the PHY when the rate monitoring is performed in the PHY and as a result a head-of-line blocking problem can arise (a particular service traffic also blocks the traffic from another service).

Although communication between PHY and NC currently takes place via the host processor of the DSL line card, the host processor manages 64 or more DSL ports, which means that the time of the information transmission is dependent on what "is currently happening on the other ports". And even if "nothing is happening" on the other ports, such communication usually takes too long, i.e. more than 100 or even more than 1000 symbols, and, for this time, cells with a DSL-port-specific back pressure compatible interface (UTOPIA or POS-PHY) become backed up in the PHY and NC. So that the L2→L0 transition occurs quickly and few cells become backed up in the process, the rate monitoring is performed in the PHY. The rate monitoring in the PHY is currently implemented for the L2 exit to L0 over a very large time window, which is so large because an L2 useful rate below NDR_L2 must not result in an L2 exit. Since the L2 handling is performed in the PHY, the scheduler output rate in the NC is often not matched at all to the currently available PHY NDR, which means that this can result in a head-of-line blocking problem.

Moreover, the above provides no solution to the problem of L0 retention during extended periods of data rate values between NDR_L0 and NDR_L2.

SUMMARY

According to an aspect of the disclosure, a method for transmitting DSL data is described. In particular, the method includes establishing a communication link between a first unit and a second unit. The communication link is selectively initiated according to one of a plurality of possible management states each defined by at least one fixed control parameter associated with a predetermined value. Upon transmitting a request to modify the predetermined value from the first unit to the second unit, the request is implemented while the link is operating according to the management state.

According to a further aspect of the disclosure, the communication link includes a data transmission channel and a control channel. Communication of requests to modify the predetermined value defining a management state may take place on either the transmission channel or the control channel.

According to a still further aspect of the disclosure, an existing communication mechanism, such as a communication mechanism defined in a DSL communication standard may be used to transmit the request, such as via the control channel.

According to a still further aspect of the disclosure, measurement of data in the data transmission channel is used to format the request. In particular, the results of data measurement such as the data rate may inform a request to modify the predetermined value associated with the control parameter defining the management state of the communication link.

According to a still further aspect of the disclosure, the predetermined control parameters include at least one of bits per symbol of the transmission link, tone specific bit loading of the transmission link, tone specific power of the transmission link and used tones for monitoring of the management state.

According to a still further aspect of the disclosure, the management states include power management states. More particularly, the management state may be the L2 power state such as defined in ITU-T G.992.3.

According to an aspect of the disclosure, a method for transmitting data is disclosed including establishing a communication link between a first unit and a second unit, initiating operation of the communication link according to a first management state, transmitting a request to the second unit to modify a predetermined value of the management state and implementing the requested modification. More particularly, the communication link according to this aspect may be selectively operable according to one of a plurality of management states, each of said management states defined by at least one fixed control parameters associated with a predetermined value, whereby the first management state is redefined by the modified predetermined value.

According to an aspect of the disclosure, a method for transmitting data is disclosed including establishing a communication link between a first unit and a second unit, the communication link comprising a data transmission channel and a control channel, the communication link selectively operable according to one of a plurality of management states, each of said management states defined by at least one fixed control parameters associated with a predetermined value. The method further includes initiating, via the control channel, operation of the communication link according to a first management state with reduced power consumption, measuring the data transmission in the data channel to obtain a measurement, formatting a request based on said measurement, and transmitting, from the first unit, said request to the second unit to modify the predetermined value.

According to a further aspect of the present disclosure, the request may be accepted or rejected by the second unit.

According to a still further aspect of the present disclosure, the step of measuring the data transmission in the data channel includes measuring the data volume, and where the management state is a low power management state as defined in ITU-T G.992.3.

According to a still further aspect of the present disclosure, where the measurement exceeds a threshold, the method further includes transmitting, from the first unit, a further request to the second unit to implement a second management state, and wherein the second management state may be a full power management state, such as the L0 power state as defined in ITU-T G.992.3.

According to a still further aspect of the disclosure, the control parameters define a range of measurable values including a minimum data range and max data rate for said measurement state.

BRIEF DESCRIPTION OF THE DRAWINGS

FIG. 2 illustrates an exemplary configuration of the invention.

DETAILED DESCRIPTION OF THE EMBODIMENTS

Figure 1A:
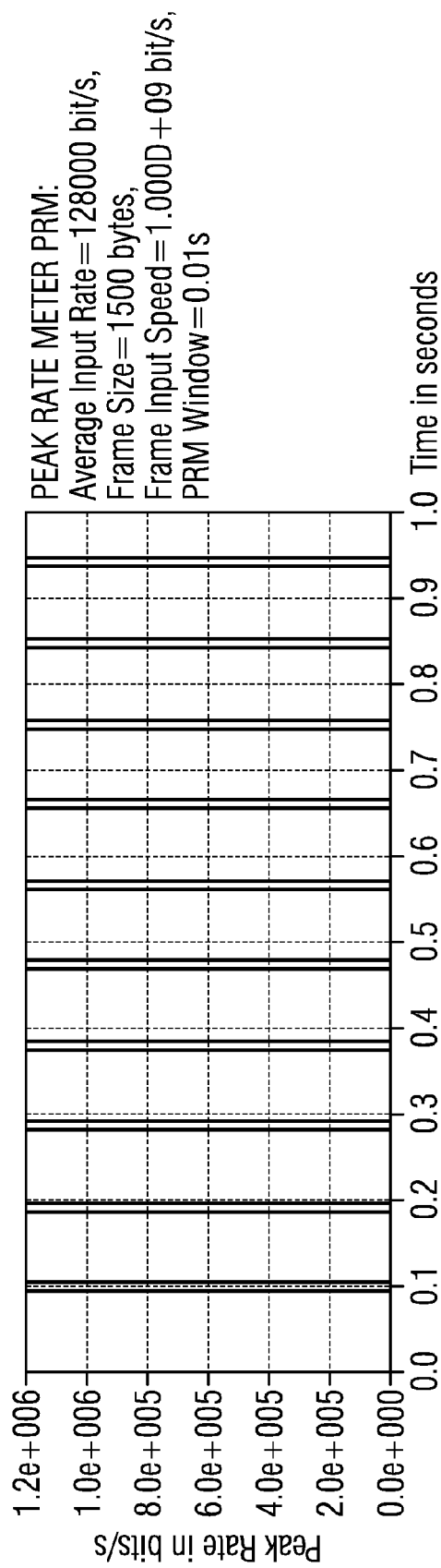
FIGS. 1a-1s shows the peak rate output as measured by a peak rate meter.
Figure 1B:
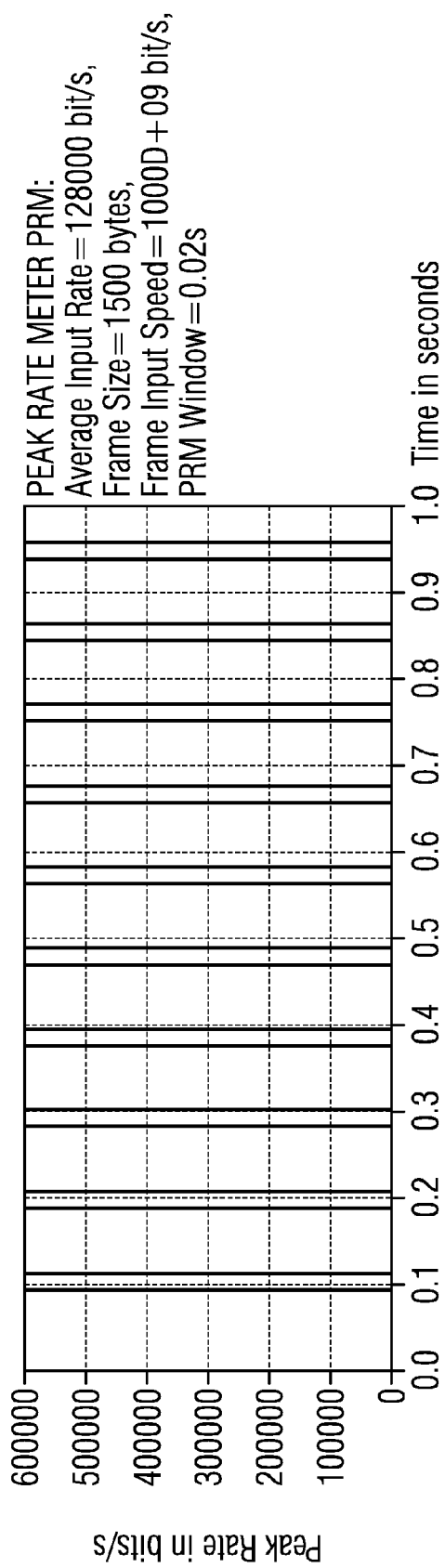
Figure 1C:
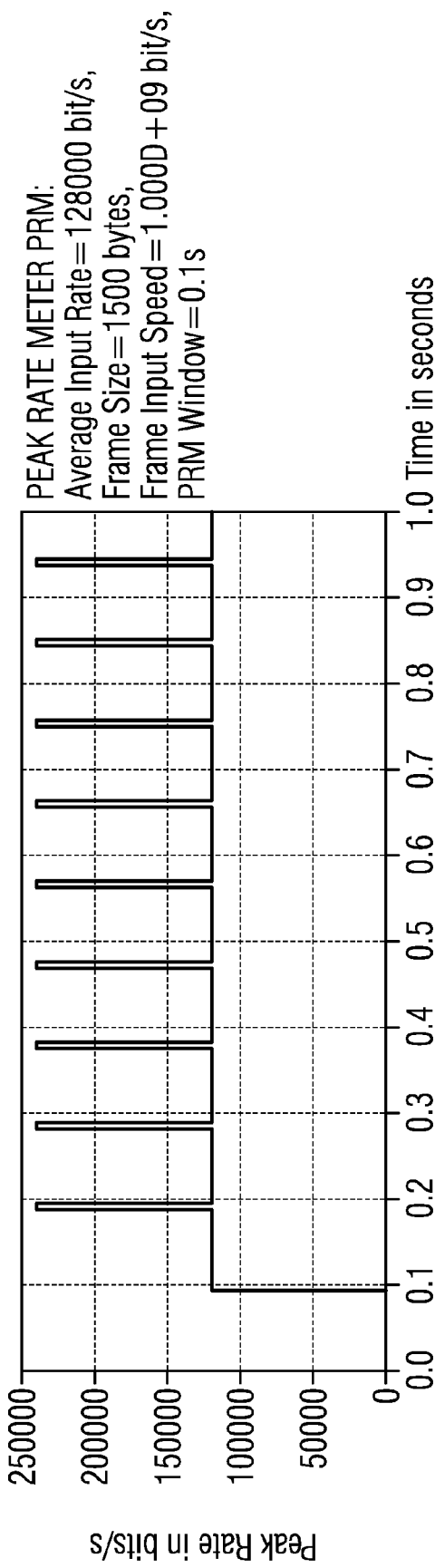
Figure 1D:
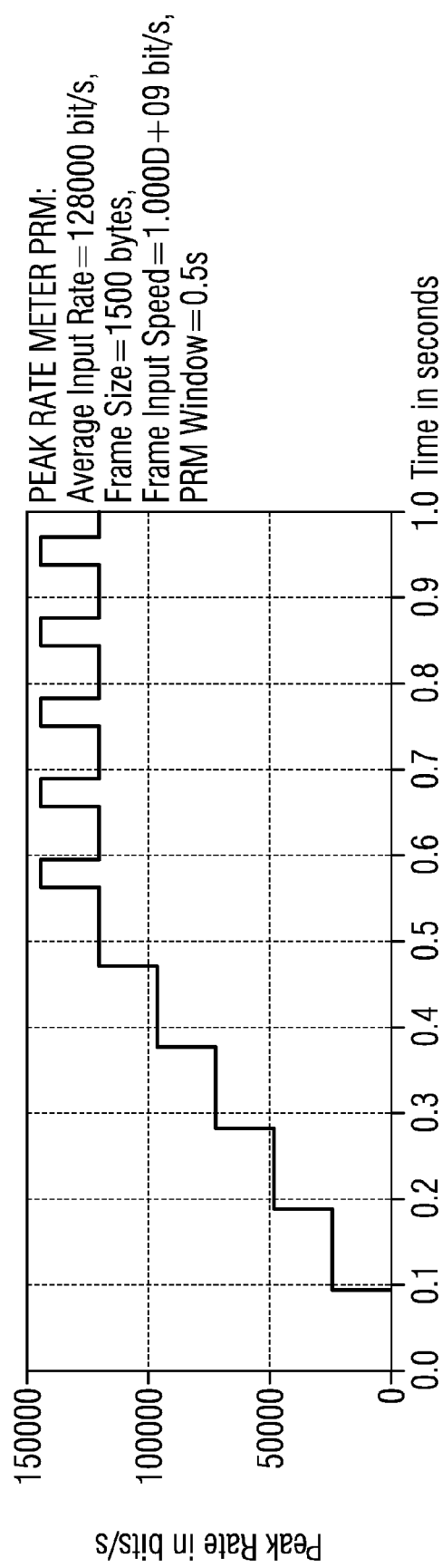

According to an embodiment, a dedicated control path in the data path for information interchange between PHY and NC is disclosed. In particular, with a 50-MHz clocked 16-bit Utopia/POS-PHY 64-port interface, the transmission time of an ATM cell is far below a symbol (maximum 50 μs when all 64 ports want to send a cell). Moreover, the internal NC firmware/software can process the information directly, e.g. can raise or lower the scheduler rate, without an external host SW being involved.

According to a further embodiment, use of a peak rate meter (PRM) in the NC is disclosed, which performs the rate monitoring but does not influence the useful data, but rather merely initiates L2 entry or exit via the mechanism as described in the previous embodiment. In addition, the port-specific scheduler output rate may advantageously be matched to the current PHY NDR (communication as in the previous embodiment).

According to this embodiment there may be no buildup of the useful data in the PHY during the transition from L2 to L0, but rather only in the NC and hence also no head-of-line blocking. Moreover, PRM allows not only L2 entry and exit but also intermediate stages in the L2 state, i.e. L2 requests in the L2 state.

According to a still further embodiment, extension of the low power mode L2 is disclosed, in which an L2 request is permitted to be made several times. That is to say that NDR & power can be reduced and increased again in steps, and this involves the use of a principle that is based on the already existing L2 principle, as set forth, for example, in one or more of the DSL standards. The advantage is a specific, dynamic customization of power and NDR on the basis of the useful rate, allowing for power savings at ND rates between the NDR of L0 and a predetermined NDR_L2.

In further detail, an embodiment is disclosed providing for the interchange of control information in the case of an ATM-based TC sublayer, wherein a dedicated ATM connection may be used which is not used otherwise, e.g. VPI=0 and VCI=23 (see also table 2 of ITU-T I.361, reproduced for convenience as Table 1 of the present application below).

TABLE 1

Table 2 of ITU-T Publication I.361 - "SERIES I: INTEGRATED SERVICES DIGITAL NETWORK"; The table as originally published was entitled
*Combinations of pre-assigned VPI, VCI, PTI and CLP values at UNI.*

| Use | VPI | VCI (Note 8) | PTI | CLP |
|---|---|---|---|---|
| Unassigned cell | 0 | 0 | Any value | 0 |
| Invalid | Any VPI value other than 0 | 0 | Any value | B |
| Unassigned cell (Note 13) | | | | 0 |
| Meta-signalling (See Recommendation I.311) | Any VPI value (Note 1) | 1 (Note 5) | 0AA | C |
| General broadcast signalling (See Recommendation I.311) | Any VPI value (Note 1) | 2 (Note 5) | 0AA | C |
| Point-to-point signalling (See Recommendation I.311) | Any VPI value (Note 1) | 5 (Note 5) | 0AA | C |
| Segment OAM F4 flow cell (See Recommendation I.610) | Any VPI value | 3 (Note 4) | 0A0 (Note 11) | A |
| End-to-end OAM F4 flow cell (See Recommendation I.610) | Any VPI value | 4 (Note 4) | 0A0 (Note 11) | A |

TABLE 1-continued

Table 2 of ITU-T Publication I.361 - "SERIES I: INTEGRATED SERVICES
DIGITAL NETWORK"; The table as originally published was entitled
*Combinations of pre-assigned VPI, VCI, PTI and CLP values at UNI.*

| Use | VPI | VCI (Note 8) | PTI | CLP |
|---|---|---|---|---|
| VP resource management cell (See Recommendation I.371) | Any VPI value | 6 | 110 (Note 9) | A |
| Reserved for future VP functions (Note 6) | Any VPI value | 7 (Note 10) | 0AA (Note 11) | A |
| Reserved for future functions (Note 7) | Any VPI value | Any VCI value in the range 8 to 15 (Note 10) | 0AA | A |
| Reserved for private network use (Note 12) | Any VPI value | Any VCI value in the range 16 to 21 | 0AA | A |
| Reserved for future functions (Note 7) | Any VPI value | Any VCI value in the range 22 to 31 (Note 10) | 0AA | A |
| Segment OAM F5 flow cell (See Recommendation I.610) | Any VPI value | Any VCI value other than 0, 3, 4, 6 or 7 | 100 | A |
| End-to-end OAM F5 flow cell (See Recommendation I.610) | Any VPI value | Any VCI value other than 0, 3, 4, 6 or 7 | 101 | A |
| VC Resource management cell (See Recommendation I.371) | Any VPI value | Any VCI value other than 0, 3, 4, 6 or 7 | 110 | A |
| Reserved for future VC functions | Any VPI value | Any VCI value other than 0, 3, 4, 6 or 7 | 111 | A |

The GFC field is available for use with all of these combinations.
A Indicates that the bit may be 0 or 1 and is available for use by the appropriate ATM layer function.
B Indicates the bit is a "don't care" bit.
C Indicates the originating entity shall set the CLP bit to 0. The value may be changed by the network.
(Note 1)—For VPI value equal to 0, the specific VCI value specified is reserved for user signalling with the local exchange. For VPI values other than 0, the specified VCI value is reserved for signalling with other signalling entities (e.g. other users or remote networks).
(Note 2)—Intentionally left blank.
(Note 3)—Intentionally left blank.
(Note 4)—According to Recommendation I.610, transparency is not guaranteed for the OAM F4 flows in a user-to-user VP.
(Note 5)—The VCI values are pre-assigned in every VPC at the UNI. The usage of these values depends on the actual signalling configurations. (See Recommendation I.311.)
(Note 6)—This VCI value is reserved to provide function for VPs.
(Note 7)—These VCI values are reserved for future standardization for specific functions.
(Note 8)—According to Recommendation I.610, cells with VCI values 1, 2, 5, 16 through 31, and greater than 31 are monitored by the VP OAM function. Cells with other VCI values are not monitored by the VP OAM function. (See also Recommendation I.150.)
(Note 9)—This specifies the allowed coding of the PTI field on transmission. This VCI value shall only be used for the stated functions regardless of the coding of the PTI field. It is an implementation option on how to process errored cells received with VCI = 6 and PTI not equal to 110. In particular, such cells may be processed as VP RM cells.
(Note 10)—Transparency of the payload for these VCI values is not guaranteed, i.e. cells with these VCI values may be extracted or inserted at midpoints of a VP. The specific situations under which this extraction/insertion may occur are for further study. In the absence of this further study, the payload for these VCI values shall be transparently transported in a VP.
(Note 11)—This specifies the allowed coding of the PTI field on transmission. These VICI values shall only be used for the stated functions regardless of the coding of the PTI field. On reception, the PTI field is not used for the purpose of identifying the cell type. For example, a cell with VCI = 4 will be treated as an end-to-end F4 OAM cell regardless of the coding of the PTI field.
(Note 12)—ITU will neither maintain nor assign this group of VCIs.
(Note 13)—For the point-to-point UNI, it is an invalid cell. If received on a point-to-point UNI, the cell will be treated as an unassigned cell (i.e. discarded). For the multiaccess UNI using GFC protocol, it is an unassigned cell. In the multiaccess UNI GFC protocol, identification of the end terminal is done by VPI values. When there is no user cell, unassigned cells are sent to the right terminal using VPI field as a terminal address.

VPI=0, VCI=16 . . . 31 have been reserved for future purposes at that time. For example: 1) VPI=0, VCI=20 for ASM cells based on G.998.1 2) VPI=0, VCI=22 for the IFX internal inband communication control protocol between a device and a host controller which is positioned on a different card in the digital subscriber line access multiplexer (DSLAM) and 3) VPI=0, VC=19 for Device Control Protocol based on chapter 6.2.1 of the publication of the ATM Forum Technical Committee "Specification of the Device Control Protocol", Version 1.0 (af-phy-138.000), February 2000, the entirety of which is expressly incorporated by reference herein.

In the case of an Ethernet-based TC sublayer, a dedicated connection may also be used which is not used otherwise, e.g. all 6 bytes of the MAC address have the hexadecimal value FE.

Control data are transmitted in the payload of the ATM cell or in MAC client data of the Ethernet frame.

The Control Data Protocol can be performed in a similar manner as described in "In-Band Management GEMINAX," submitted with this patent, but its appearance should be as simple as possible.

The error rate on a connection via a UTOPIA/POS-PHY interface is very low in contrast to the error rate on a DSL link, but bit errors cannot be ruled out and it is therefore advantageous to have a rudimentary bit error recognition mechanism, and also the option of retransmission in the case of error.

In the case of the Ethernet frame, a CRC may be calculated using MAC client data anyway, as is standardized. In this case, the error recognition would be already "inherently included". In the case of ATM cells, there is a header error control (HEC) such as in the 5th header byte, but in this case a CRC may be formed only using the header and not using the payload, and also this HEC is not defined outside the PHY; that is to say that the TCS receiver would need to check a cell HEC which comes from the line, but not the NC. The introduction of AAL5 for the error recognition as in the case of the inband protocol may not be necessary at this point, since only an HW interface is involved, which is situated inside the line card. A simple condition such as "control data with odd number of bits equal 1" or "control data with even number of bits equal 1" should suffice.

A timeout mechanism for retransmission may not be required, since in this case there is no risk of this data unit simply being lost. However, an acknowledge mechanism is required. The absence of an Acknowledge may actually stem only from the fact that the transmitter at the opposite end has not sent it. Instead of the timeout mechanism, the transmitter would simply need to overwrite the remaining entry which has not been acknowledged with the next new one in its transmit buffer in order to cover this protocol error.

Regarding the insertion of such a specific cell or Ethernet frame, care may be taken to ensure that it is a forced insertion so that a delay as a result of bursts of useful data may be prevented. This may advantageously take place quickly. If there are sufficient addresses available on the UTOPIA/POS-PHY interface, this issue may arise less frequently because it would then be possible to use dedicated addresses for the interchange of the control data.

Certain primitives may need to be transmittable. Whenever data build up, this novel Control Data Protocol needs to be used to quickly communicate that a rate change needs to take place:
  a) In L2 mode, should the useful rate rise, useful data build up in the NC, and the NC would advantageously inform the PHY that the NDR needs to be increased.
  b) In case the NDR in the PHY has been reduced (such as by a seamless rate adaptation (SRA) downshift or by an L2 entry), and the PHY would need to inform the NC the new NDR so that the NC can set its output scheduler appropriately in order to prevent cells from building up in the PHY. To the extent that less time-critical communications exist, they may also be communicated via this novel interface.
  c) In case the useful rate falls and the NC notifies the PHY of what reduced NDR is meant to be available (L0 to L2 or further NDR reduction in L2), and
  d) Where the NCR in the PHY has been increased (by an SRA uplift or by an L2 exit), and the PHY informs the NC what the new NDR is.

In a further embodiment, an entity in the NC is disclosed which measures, possibly continuously, the useful rate in order to trigger a possible L2 request, and an entity is disclosed which monitors whether a rapid rate increase needs to be triggered (L2 exit or L2 request at relatively high rate and relatively low power cutback) may be required.

This embodiment firstly contemplates advantageously observing a peak rate (NumberOfReceivedBytes/DeltaT with low DeltaT), in order to ascertain a necessary rate increase, and secondly contemplates advantageously observing an average rate (NumberOfReceivedBytes/DeltaT with high DeltaT, in order to ascertain a possible rate reduction. To this end, it may be advantageous to look at the typical useful data transfer. If an exemplary DSLAM with a 1 Gbit/s Ethernet-based backplane is involved, which may be typical under certain circumstances, there may be an input rate of 1 Gbit/s for the duration of an Ethernet packet. Again, typically, a peak rate of 1 Gbit/s would not be desired for the rate monitoring. This means that the time window DeltaT for the peak rate is advantageously set at least large enough for it to comprise two Ethernet packets. If standard Ethernet frames with up to 1500 octets are being handled, 3000 octets need to be taken as a basis.

A question remains as to what rate may be needed to be referenced in order to determine DeltaT. In this regard, a number of exemplary simulation results can be envisioned, for which a backplane rate of 1 Gbit/s (Frame Input Speed) has been taken as a basis and also an originally constant useful rate (Average Input Rate), which reaches the NC as 1500-byte bursts (Frame Size) with equidistant intervals. The peak rate meter PRM typically calculates a current rate using a time window from the past (PRM window).

As can be seen from FIGS. 1$a$-1$s$, excessively small time windows can result in an excessively high rate measurement and hence in an L2 exit. By contrast, large time windows result in sluggishness such that rapid rate increases are detected only slowly, which leads to data build up. A suitable and advantageous compromise may be a window of 50 ms, for which rates of down to 250 kbit/s are still measured reasonably precisely and the buffer capacities in an NC are adequate (in the case of the IFX chip ConverGate-D, approximately 10 000 cells per DSL port).

According to a still further embodiment, an extended low power mode is defined, subsequently called L2d (for L2 dynamic). This novel L2d mode has not only a transition from L0 to L2d (L2d entry) and vice versa (L2d exit), but also L2d requests, which allow NDR & Power to be reduced or increased in the L2d state.

In this regard, an exemplary L2 mechanism is defined in G.992.3 and G.997.1.

As illustrated in G.997.1, the following can be configured:

PMSF (Power Management State Forced), 2-bit field: the value x indicates the power state to which Lx needs to be forced PMMode (Power Management Mode), 2-bit field: bit map indicates the power state (bit0 for L3, bit1 for L2) to which autonomous switching can (bit=1) or cannot (bit=0) be performed L0-time: min. time from L2 exit to fresh L2 entry L2-Time: min. time from L2 entry to first L2 power trim and also between 2 successive power trims L2-ATPR: max. power reduction for L2 request or L2 trim L2-ATPRT: total max. power reduction in L2

L2-MinRate: min. NDR which needs to be available in L2.

According to the example of 9.5.3.3/G.992.3, the L2 entry, i.e. the L0→L2 transition, takes place in the following sequence:

When PMSF=2 is transmitted to the ATU-C, ATU-C uses the other configured G.997.1 parameters to initiate the L2 entry with an overhead channel command. This power management command is an L2 request from the ATU-C with the parameters minPCBds, MaxPCBds, MinLp, MaxLp, the details of which are provided in 9.4.1.7.3/G.992.3.

ATU-R then responds to the ATU-C with an L2 grant (where acceptable; otherwise it gives an L2 reject) and appropriate parameters, (see Table 2 of the present application below).

TABLE 2

Table 9-22 of ITU-T Publication G.992.3. - "SERIES G: TRANSMISSION SYSTEMS AND MEDIA, DIGITAL SYSTEMS AND NETWORKS"; The table as originally published was entitled *Power management command transmitted by the responding ATU.*

| Message length (octets) | | Element name (command) |
|---|---|---|
| 2 | $80_{16}$ | Grant |
| 3 | $81_{16}$ | Reject followed by: 1 octet for reason code |
| 6 + 2 × $N_{LP}$ + 3 × $N_f$ | $82_{16}$ | L2 grant followed by: 2 × $N_{LP}$ octets containing new Lp values for the $N_{LP}$-enabled latency paths. |

TABLE 2-continued

Table 9-22 of ITU-T Publication G.992.3. - "SERIES G: TRANSMISSION SYSTEMS AND MEDIA, DIGITAL SYSTEMS AND NETWORKS"; The table as originally published was entitled *Power management command transmitted by the responding ATU.*

| Message length (octets) | Element name (command) |
|---|---|
| | 1 octet containing the actual PCBds value |
| | 1 octet containing the exit symbol PCBds value. |
| | 1 octet containing the exit symbol $b_i/g_i$ table flag. |
| | 1 octet for the number of carriers $N_f$ |
| | 3 × $N_f$ octets describing subcarrier parameter field for each subcarrier |
| 3 | $83_{16}$ L2 reject followed by: |
| | 1 octet for reason code |
| 3 | $84_{16}$ L2 trim grant followed by: |
| | 1 octet containing the exit symbol PCBds value |
| 3 | $85_{16}$ L2 trim reject followed by: |
| | 1 octet for reason code |
| | All other octet values are reserved by ITU-T. |

ATU-C can then send an L2 trim request to the ATU-R as described in 9.4.1.7.4/G.992.3.

The ATU-R then, where acceptable, responds with an L2 trim grant.

The action with the L2 trim can continue until L2-ATPRT has been reached.

The additional allowance of an L2 request, permitted not only in the L0 state but also in the L2 state allows the ATU-C to initiate an appropriate L2 for every new forced L2 via PMSF=2 at a new L2 min rate. The increase in the NDR & Power is also not a problem as a result of the parameters in the L2 request.

Certain aspects of an exemplary standard may therefore be modified by the above disclosure, and in particular the implementation of an L2d state. For example, the sentence in G.992.3 "Therefore, constraints as displayed in Table 7-8 and placed on MSGmin, the overhead rate, the delay, and overhead channel period do not apply while the link is in L2 state" can no longer always be valid. For example, when the NDR in L2d is set to 2 MBit/s, an operator may not want all the other service parameters such as MaxDelay, for example, to be exceeded at once. This cited sentence stems from the fact that L2 mode was originally regarded as a screensaver mode in which useful data with little relevance are transported. This need not be the case in the L2d mode, however, with the following consequences:

It may be advantageous to provide the option for the L2d mode to provide notification of how much margin for later online reconfigurations needs to be taken into account of which service parameters during the actual training. In this case, however, the situation is now that this L2d mode should also be able to be used for fixed rate configurations (MinRate=MaxRate). L2d only involves a rate reduction in comparison with the L0 rate (no increase), which means that only the service parameters MaxDelay, MSGmin, ORmin, PERmax are affected (not MinINP). In order to simplify the matter, the operator may advantageously include an appropriate margin from the outset for MaxDelay and MSGmin in the calculation when L2d mode is intended to be used.

An exemplary procedure may be as follows:

The recommended configuration value for MSGmin is 6 kbit/s, and the minimum is 4 kbit/s. The message overhead channel rate MSG is proportional to the number of bits per symbol Lp. For the L2d mode, it would be advisable to prescribe an MSGmin of 24.28 kbit/s, so that the L0 rate can then be reduced by the factor 6.7 without the MSG rate falling below 4 Kbit/s. The preset MaxDelay=1 is a special value, since this means that no interleaving is intended to be performed. And when no interleaving is performed, there is also no need for a margin for L2d. In the same way, this applies to the specific value MaxDelay=0 (no delay bounds). For all other cases, MaxDelay=2.63 ms, the operator may advantageously decide what margin is still feasible for the desired impulse noise protection and the desired L0 NDR (see Table 3 of the present application below.)

TABLE V.1

Maximum downstream net data rate (kbit/s) for various values of delay_min = delay_max and INP_min

| | | INP_min (Note 2) | | | | | | |
|---|---|---|---|---|---|---|---|---|
| | | 0 | ½ | 1 | 2 | 4 | 8 | 16 |
| delay_min | 1 (Note 1) | 14656 | 0 | 0 | 0 | 0 | 0 | 0 |
| delay_max | 2 | 14656 | 7104 | 3008 | 960 | 0 | 0 | 0 |
| (ms) | 4 | 14656 | 13632 | 7104 | 3008 | 960 | 0 | 0 |
| | 8 | 14656 | 13632 | 13632 | 7104 | 3008 | 960 | 0 |
| | 16 | 8064 | 7552 | 7552 | 7552 | 3520 | 1472 | 448 |
| | 32 | 3968 | 3712 | 3712 | 3712 | 3712 | 1728 | 704 |

NOTE 1
In [ITU-T G.997.1]. a 1 ms delay is reserved to mean that $S_p \le 1$ and $D_p = 1$.
NOTE 2
Values of INP_min in grey are optional.

TABLE 3: Table V.1 of ITU-T Publication G.992.3.—"SERIES G: TRANSMISSION SYSTEMS AND MEDIA, DIGITAL SYSTEMS AND NETWORKS"; The table as originally published was entitled Maximum downstream net data rate (kbit/s) *for various values of delay_min=delay max and INP min.*

Delay is inversely proportional to Lp, and it may be that extremely large factors between L0 and L2 rates, e.g. 16 Mbit/s in L0 and 128 kbit/s in L2, result in an extreme delay magnification by the same factor, in this case 16 000/128=125, in which case 2 ms in L0 then becomes 250 ms in L2. It is recommendable to choose a MaxDelay=2.4 in Ltd mode. On the other hand, the NC could also have the option of calculating the current delay so as then to take its service queue filling levels as a basis for deciding whether an L2d request to lower the useful rate is advantageous; that is to say that, for example, if the service queue is filled with time-sensitive useful data, such as a gaming application, the L2d request may advantageously be delayed or not transmitted to the PHY; by contrast, if it is empty, the L2d request would be transmitted.

FIG. 2 illustrates an exemplary configuration 100 including an operator's site 104, also known as the ATU-C, central unit or near end unit. Site 104 includes a first transceiver Unit 102a which includes controller 110a, which controls transmitter 112a and receiver 114a. First transceiver unit 102a is connected by communication link 106 to a subscriber's site 108, also known as the ATU-R, remote unit or far end unit. More particularly, communication link 106 is connected to second transceiver unit 102b at subscriber's site 108. Second transceiver unit 102b includes controller 110b, transmitter 112b and receiver 114b.

Also in accordance with FIG. 2, process steps related to the implementation and execution of an L2d mode. In particular, a transceiver unit 102, for example near-end unit 102a evaluates data stream traffic on transmission data stream 254 from near end to far end, such monitoring/evaluation taking place periodically or continuously. Parameters measured may include NDR, the buffer filling level of user data, the number of consecutive user data bytes without any decoupling (without idle byte/idle cell insertion), the decoupling data rate, the user data rate or the bandwidth utilization=user rate/(user rate decoupling rate). Based on this measurement/evaluation, near-end unit 102a detects whether a power related online reconfiguration OLR should be executed at 256. According to detection 256, a power related OLR request 258 may be sent. In response, far-end unit 102b may send a power related OLR grant in response 260, thus completing a synchronized change of layer 1 control parameters at near-end and far-end 262.

The same process may work in reverse, where far-end unit 102b monitors/evaluates data transmission stream, such as in the reverse direction, and requests power related reconfiguration from near-end 102a. Moreover, response 260 may take the form of a refusal of the power related OLR request, for example depending on predetermined conditions such as at the far-end. In this case, a refusal is to be distinguished from a "negative acknowledge", the refusal being a recognition of and condition-based refusal to implement a request, whereas the negative acknowledge indicates that the far-end unit in question may not be compatible with the Ltd mode, and does not recognize the request to redefine a fixed parameter.

Figure 3A:
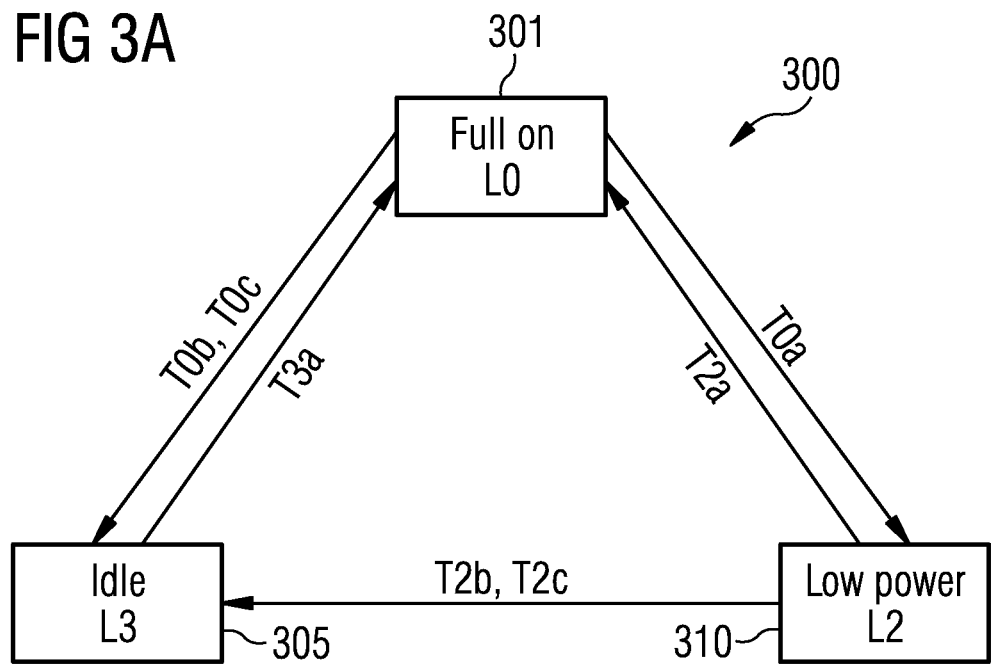
FIGS. 3a and 3b schematically illustrates a power management arrangement.

FIG. 3a schematically illustrates a power management arrangement applicable to the exemplary configuration 250 of FIG. 2. In particular, L0 mode 301 represents a full-on state, wherein bandwidth is maximized, for example at the expense of power savings. From L0 mode 301, the exemplary configuration can enter an L3 idle mode 305 such as via commands T0b, T0c. During the L3 link state, the ATUs are operated according to the power management subclauses of clauses 6, 7 and 8 of the G.992.3 standard. In the L3 link state, the Management protocol-specific transmission convergence (MPS-TC) (defined in the G.992.3 standard) has no specified function. In L3 idle mode 305, there is no signal transmitted at the U-C and U-R reference points.

In the L3 link state, an ATU may determine to use an initialization procedure. An ATU that receives a higher layer signal to activate shall use the initialization procedure defined in clauses 6, 7 and 8 of the G.992.3 standard. An ATU that detects the signals of the initialization procedure at the U reference point, if enabled, shall respond by using the initialization procedure. If disabled, the ATU shall remain in the L3 link state. The ATU may be powered or unpowered in L3 idle mode 305. Configuration 300 may selectively exit L3 idle mode 305 such as via command T3a. Such exit typically returns configuration 300 to L0 mode 301.

Alternately, configuration may enter L2 low-power mode 310 wherein power savings is achieved, typically at the expense of bandwidth. A T0a command may trigger entry to L2 low-power mode 310 as described above, where sustained low measured bandwidth communication indicates entry into L2 low-power mode may advantageously reduce power consumption without causing data back-up. Likewise, where measured bandwidth usage increases, reentry to L0 mode 301, such as via command T2a, can be executed to restore a maximized bandwidth capability to configuration 300. Alternately, where entry into L3 idle mode 305 is indicated, command T2b or T2c may, for example trigger such entry from L2 low-power mode.

Figure 3B:
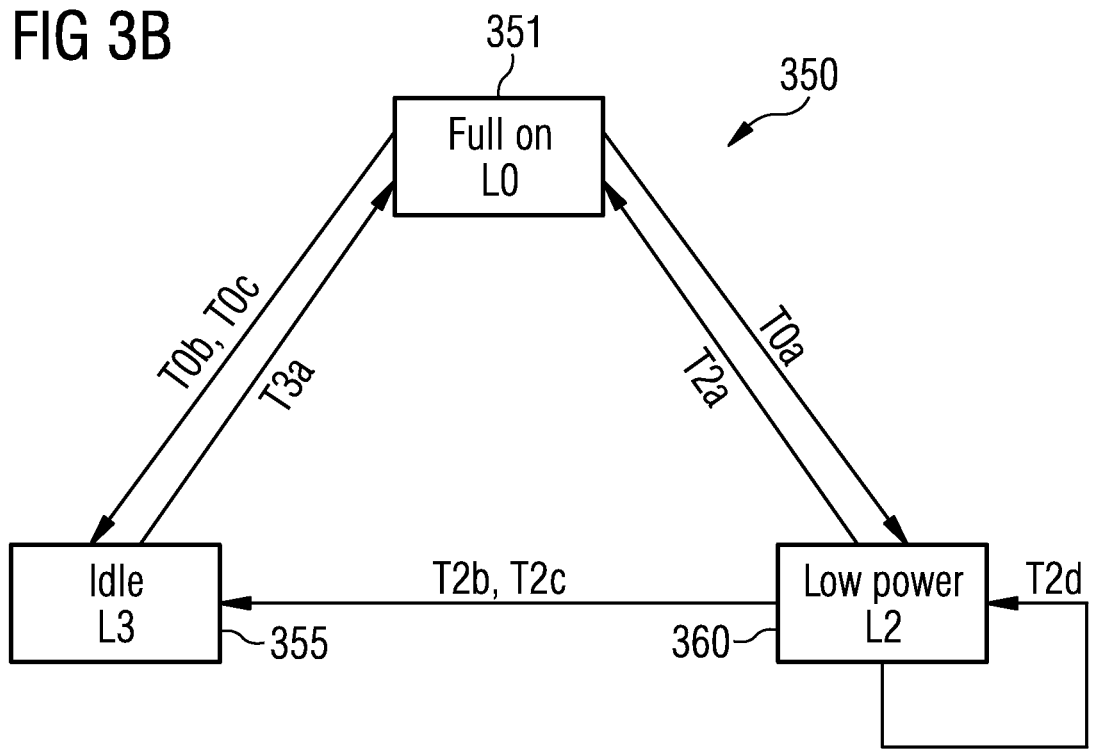

FIG. 3b illustrates an exemplary embodiment of the L2d mode of the present disclosure, wherein, as described above, L0 mode 351 represents a full-on state, wherein bandwidth is maximized, for example at the expense of power savings. From L0 mode 351, the exemplary configuration can enter an L3 idle mode 355 such as via commands T0b, T0c. In L3 idle mode 305, there is no signal transmitted at the U-C and U-R reference points. The ATU may be powered or unpowered in L3 idle mode 305. Configuration 100 may selectively exit L3 idle mode 355 such as via command T3a. Such exit typically returns configuration 350 to L0 mode 351.

Alternately, configuration may enter L2 low-power mode 360 wherein power savings is achieved, typically at the expense of bandwidth. A T0a command may trigger entry to L2 low-power mode 360 as described above, where sustained low measured bandwidth communication indicates entry into L2 low-power mode may advantageously reduce power consumption without causing data back-up. Likewise, where measured bandwidth usage increases, reentry to L0 mode 351, such as via command T2a, can be executed to restore a maximized bandwidth capability to configuration 350. However, in the embodiment of FIG. 3b, a modified L2d mode 365 is disclosed.

When the ATU-C (the central or near end unit) sends an L2d request, such as via a T2d command, to ATU-R (the remote or far end unit) for the first time after showtime entry, this is no different from the L2 request. When configuration 350 is then in the L2 state and a low power request is then sent, there are two scenarios:

i) ATU-R supports L2 requests in the L2 state too. The solution therefore works.
ii) ATU-R supports L2 requests in the L0 state only, and an L2 request in the L2 state is always rejected. It is therefore possible to implement only an L2 NDR.

In the second scenario, although the disclosed L2d mode does not implement in the ATU-R, the system maintains backward compatibility, functioning as normal in L2 mode.

In this way, extension of the low power mode L2 is disclosed, in which an L2 request is permitted to be made several times. That is to say that NDR & power can be reduced and increased again in steps, and this involves the use of a principle that is based on the already existing L2 principle. The advantage is a specific, dynamic customization of power and NDR on the basis of the useful rate.

Stated another way, the power management states such as L0 and L2 are defined by fixed control parameters that are associated with a predetermined value. Whereas the standards contemplate "trimming" of values in L2 other than NDR, for example including a flat power trim, the fixed control parameters are not trimmable, rely on a predetermined value, and essentially define the management state. By replacing the predetermined value, it is thus possible to redefine the management state without rendering the parameter associated with the predetermined value "trimmable" as that term may be understood from a reading of the DSL standards. In this sense, there is a clear distinction between a fixed value that defines a management state, and a variable parameter that may be modified within that state.

Figure 4:
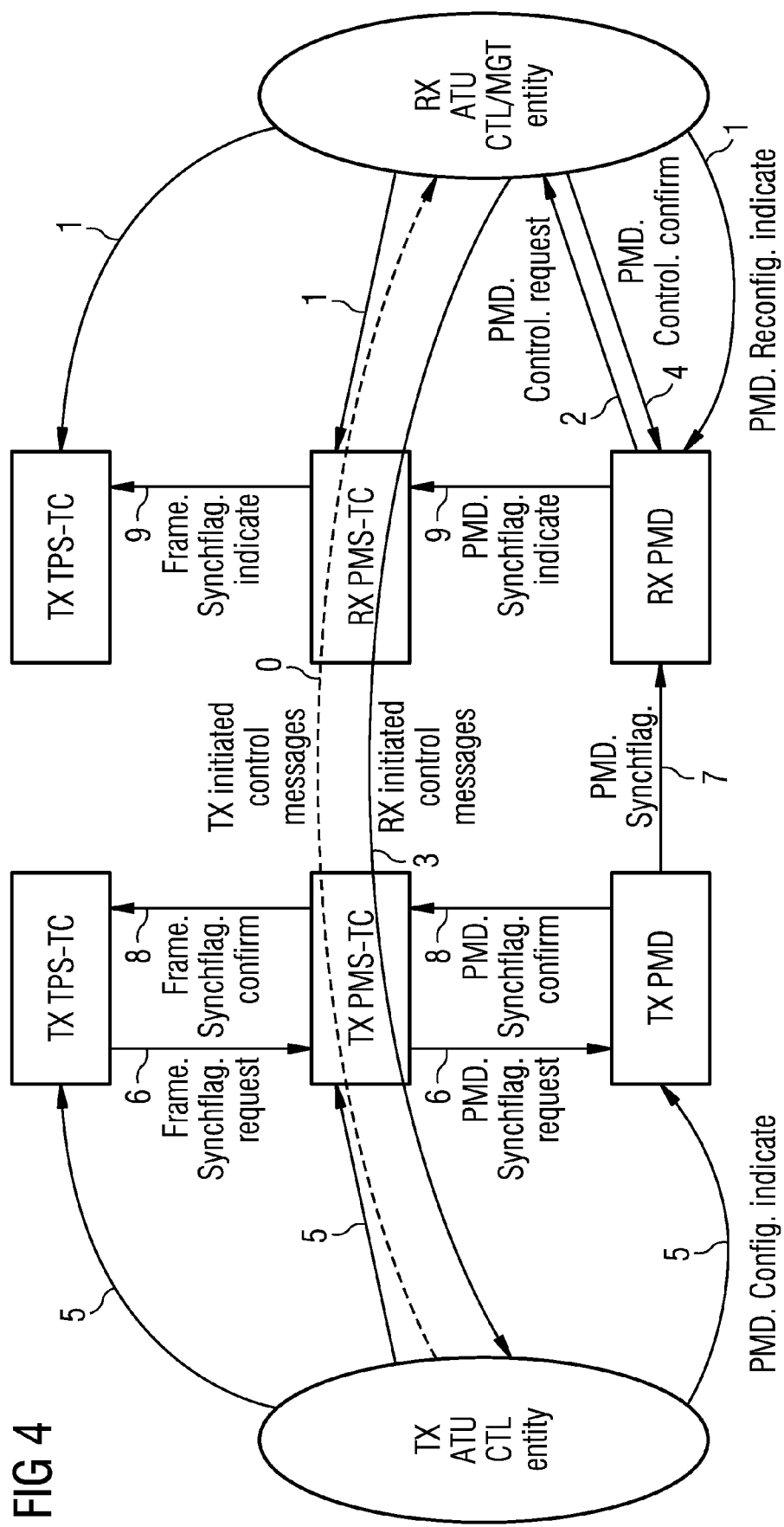
FIG. 4 illustrates the steps involved in the receiver-initiated power management transition.

FIG. 4, which is a reproduction of FIG. 10-2 from ITU-T G.992.3, illustrates the steps involved in the receiver-initiated power management transition.

The invention claimed is:
1. A method for transmitting DSL data comprising:
establishing a DSL communication link between a first unit and a second unit, the communication link selectively operable according to one of a plurality of management states, each of said management states defined by at least one fixed control parameters associated with a predetermined value;
initiating operation of the communication link according to a first management state;
transmitting from the first unit a request to the second unit to modify said predetermined value, wherein the second unit selectively rejects the request; implementing the request if not rejected while said link is operating according to the first management state, and monitoring a peak rate to determine a necessary rate increase on the communication link.

2. The method of claim 1, wherein the communication link comprises a data transmission channel and a control channel.

3. The method of claim 1, wherein the communication link is established using an existing communication mechanism.

4. The method of claim 2, wherein the request from the first unit is transmitted via said control channel.

5. The method of claim 2, further comprising measuring data in the data transmission channel to obtain a measurement thereof; and formatting the request consistent with the measurement.

6. The method of claim 1, wherein said predetermined control parameters include at least one of bits per symbol of the transmission link, tone specific bit loading of the transmission link, tone specific power of the transmission link and used tones for monitoring of the management state.

7. The method of claim 6, wherein said management states are power management states.

8. The method of claim 7, wherein the first management state is the L2 power state as defined in ITU-T G.992.3.

9. A method for transmitting data comprising:

establishing a DSL communication link between a first unit and a second unit, the communication link selectively operable according to one of a plurality of management states, each of said management states defined by at least one fixed control parameter associated with a predetermined value;

initiating operation of the communication link according to a first management state;

transmitting from the first unit a request to the second unit to modify said predetermined value, wherein the second unit selectively rejects the request; and implementing the requested modification if the request is not rejected;

whereby the first management state is redefined by the modified predetermined value monitoring a peak rate to determine a necessary rate increase on the communication link.

10. The method of claim 9, wherein the communication link comprises a data transmission channel and a control channel.

11. The method of claim 10, wherein the request from the first unit is transmitted via said control channel.

12. The method of claim 9, further comprising measuring data in the data transmission channel to obtain a measurement thereof; and formatting the request consistent with the measurement.

13. The method of claim 9, wherein said control parameters define at least one of bits per symbol of the transmission link, bit loading of the transmission link, tone specific power of the transmission link and used tones for monitoring of the management state.

14. A method for transmitting data comprising:

establishing a DSL communication link between a first unit and a second unit, the communication link comprising a data transmission channel and a control channel, the communication link selectively operable according to one of a plurality of management states, each of said management states defined by at least one fixed control parameter associated with a predetermined value;

initiating, via the control channel, operation of the communication link according to a first management state with reduced power consumption;

measuring the data transmission in the data channel to obtain a measurement;

formatting a request based on said measurement;

transmitting, from the first unit, said request to the second unit to modify said predetermined value, wherein the second unit selectively rejects the requests monitoring a peak rate to determine a necessary rate increase on the communication link.

15. The method of claim 14, wherein the step of measuring the data transmission in the data channel includes measuring the data volume.

16. The method of claim 14, wherein the first management state is a low power management state as defined in ITU-T G.992.3.

17. The method of claim 14, wherein if the measurement exceeds a threshold, transmitting, from the first unit, a further request to the second unit to implement a second management state.

18. The method of claim 17, wherein the second management state is a full power management state.

19. The method of claim 18, wherein the second management state is the L0 power state as defined in ITU-T G.992.3.

20. The method of claim 14, wherein said control parameters define a range of measurable values.

21. The method of claim 20, wherein said range includes a minimum data range and max data rate for said measurement state.

22. The method of claim 7, further comprising:

communicating between a network controller (NC) and a physical layer (PHY) of one of the first or second unit to determine one of the plurality of management states.

23. The method of claim 7, further comprising:

monitoring an average rate to determine a possible rate decrease.

* * * * *